United States Patent
Zhang et al.

(10) Patent No.: US 9,064,098 B2
(45) Date of Patent: Jun. 23, 2015

(54) METHOD, APPARATUS AND SYSTEM FOR SOFTWARE MANAGEMENT

(71) Applicant: Huawei Device Co., Ltd., Shenzhen (CN)

(72) Inventors: Qinliang Zhang, Shenzhen (CN); Huangwei Wu, Shenzhen (CN); Yu Zhu, Shenzhen (CN); Ping Fang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/759,487

(22) Filed: Feb. 5, 2013

(65) Prior Publication Data
US 2013/0152220 A1    Jun. 13, 2013

Related U.S. Application Data

(63) Continuation of application No. PCT/CN2011/077936, filed on Aug. 3, 2011.

(30) Foreign Application Priority Data

Aug. 5, 2010 (CN) .......................... 2010 1 0245982

(51) Int. Cl.
*G06F 21/12* (2013.01)
*G06F 21/44* (2013.01)
(Continued)

(52) U.S. Cl.
CPC ............... *G06F 21/12* (2013.01); *G06F 21/44* (2013.01); *G06F 21/57* (2013.01); *G06F 8/61* (2013.01)

(58) Field of Classification Search
None
See application file for complete search history.

(56) References Cited

U.S. PATENT DOCUMENTS

| 6,457,076 B1 * | 9/2002 | Cheng et al. .................... 710/36 |
| 7,882,356 B2 * | 2/2011 | Klemets et al. ............... 713/172 |

(Continued)

FOREIGN PATENT DOCUMENTS

| CN | 1407446 A | 4/2003 |
| CN | 1224218 C | 10/2005 |

(Continued)

OTHER PUBLICATIONS

Ellison, C., "Device Security: 1, Service Template for UPnP Device Architecture 1.0," Standardized DCP, XP007900026, Nov. 17, 2003, 66 pages.

(Continued)

*Primary Examiner* — Jeffrey Pwu
*Assistant Examiner* — Wasika Nipa
(74) *Attorney, Agent, or Firm* — Conley Rose, P.C.; Grant Rodolph; Nicholas K. Beaulieu

(57) ABSTRACT

A method, apparatus and system are disclosed for software management, relating to the technical field of communications, and allowing software installed on a UPnP device by a service provider to be managed only by that service provider. The method comprises: receiving a software installation command sent by a first control device, installing software according to the software installation command and storing a first authentication information required during management of the software; receiving a software management command sent by a second control device, and acquiring a second authentication information corresponding to the software management command, which command is used in managing the software; when the second authentication information is consistent with the first authentication information, executing the software management command.

21 Claims, 4 Drawing Sheets

(51) Int. Cl.
  *G06F 21/57* (2013.01)
  *G06F 9/445* (2006.01)

(56) References Cited

U.S. PATENT DOCUMENTS

| | | | |
|---|---|---|---|
| 7,889,684 B2* | 2/2011 | Chai et al. | 370/259 |
| 8,132,166 B2* | 3/2012 | DeHaan | 717/177 |
| 8,346,897 B2* | 1/2013 | Jaroker | 709/220 |
| 2006/0026228 A1* | 2/2006 | Kim | 709/202 |
| 2006/0026304 A1* | 2/2006 | Price | 710/8 |
| 2007/0192158 A1* | 8/2007 | Kim | 705/9 |
| 2009/0235243 A1* | 9/2009 | Jung et al. | 717/168 |
| 2012/0005520 A1* | 1/2012 | Ashraff et al. | 714/4.11 |

FOREIGN PATENT DOCUMENTS

| | | | |
|---|---|---|---|
| CN | 1801743 A | | 7/2006 |
| CN | 101005678 | * | 7/2007 |
| CN | 101005678 A | | 7/2007 |
| FR | EP2073440 | * | 6/2009 |
| JP | 2009187475 A | | 8/2009 |
| WO | 2007019557 A2 | | 2/2007 |

OTHER PUBLICATIONS

"SoftwareManagement: 1, Service Template Version 1.01 for UPnP Version 1.0," Standardized DCP (SDCP), XP055067371, Jul. 20, 2010, 76 pages.
Foreign Communication From a Counterpart Application, European Application No. 11814102.7, Extended European Search Report dated Jul. 1, 2013, 8 pages.
Foreign Communication From a Related Counterpart Application, International Application No. PCT/CN2011/077936, English Translation of International Search Report dated Nov. 10, 2011, 2 pages.
Foreign Communication From a Related Counterpart Application, International Application No. PCT/CN2011/077936, English Translation of Written Opinion dated Nov. 10, 2011, 9 pages.
Lortz, et al., "Device Protection: 1 Service," for UPnP Version 1.0, Working Draft, Version 0.87c, Jul. 12, 2010, 68 pages.

* cited by examiner

METHOD, APPARATUS AND SYSTEM FOR SOFTWARE MANAGEMENT

CROSS-REFERENCE TO RELATED APPLICATIONS

This application is a continuation of International Application No. PCT/CN2011/077936, filed on Aug. 3, 2011, which claims priority to Chinese Patent Application No. 201010245982.2, filed on Aug. 5, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communication technologies, and in particular, to a method, an apparatus and a system for software management.

BACKGROUND

In Universal Plug and Play Device Management (UPnP DM), security protection is carried out on a Universal Plug and Play (UPnP) device via a Device Protection (DP) mechanism defined by the UPnP protocol. In the DP mechanism, a user with administrator right generally has the highest access right on the UPnP device.

At present, service providers also want to be able to manage the UPnP device. The service provider disposes a UPnP DM Control Point (CP) on the gateway of the user in advance and implements the management on a terminal that supports UPnP DM via the UPnP DM CP on the gateway. If the user wants to use an advanced service on the terminal, the user first subscribes for the advanced service from the service provider and obtains the terminal that supports the service, wherein the terminal may be provided by the service provider or purchased by the user in a retail outlet, and the terminal also supports the UPnP DM function. The service provider installs remotely a software module (DU) for the advanced service on the terminal via the CP on the gateway, and the service provider expects that the software module can only be managed (including starting, stopping, uninstalling, etc.) by himself, and the user cannot manage the software module installed by the service provider.

However, the inventors find that in the UPnP security architecture, the user is the owner of the UPnP device, in other words, the user has the administrator right of the UPnP device. Since the administrator right has the highest right, the user may perform any operation, including the management on the software modules installed on the UPnP device by other users. At present, the problem lies in that in the current UPnP security architecture, when the service provider is authorized and installs the software provided by the service provider on the UPnP device, the software not only can be managed by the service provider, but also can be managed by the user. Thus the service provider cannot control the management operation of the user on the software, so that the management on the software is uncontrollable for the service provider.

SUMMARY

Embodiments of the present invention provide a method, an apparatus and a system for software management, which can realize that software installed on a communication device by a service provider can only be managed by said service provider, and a user cannot manage the software installed on the communication device by the service provider.

To attain the above object, the following technical solutions are employed in the embodiments of the present invention:

A method for software management, including: receiving a software installation command sent by a first control device, installing software according to the software installation command and saving first authentication information required in managing the software; receiving a software management command for managing the software sent by a second control device, and acquiring second authentication information corresponding to the software management command; and executing the software management command when the second authentication information is consistent with the first authentication information.

A communication device, including: a software installing unit adapted to receive a software installation command sent by a first control device, install software according to the software installation command and save first authentication information required in managing the software; an acquiring unit adapted to receive a software management command for managing the software sent by a second control device, and acquire second authentication information corresponding to the software management command; and a software managing unit adapted to execute the software management command when the second authentication information is consistent with the first authentication information.

A system for software management, including: a first control device adapted to send a software installation command to a communication device, instruct the communication device to install software and save first authentication information required in managing the software; a communication device adapted to receive the software installation command sent by the first control device, install the software according to the software installation command and saving the first authentication information required in managing the software; a second control device adapted to send a software management command to the communication device and instruct the communication device to manage the software; wherein, the communication device is further adapted to receive a software management command sent by the second control device, acquire second authentication information corresponding to the software management command, and execute the software management command when the second authentication information is consistent with the first authentication information, wherein the software management command is used for managing the software.

It should be noted that, the first control device and the second control device herein may be the same control device, or may be different control devices.

By employing the method for software management according to the embodiments of the present invention, the communication device installs software according to the software installation command received and saves the first authentication information required when managing the software, receives the software management command for managing the software, and acquires the second authentication information required in managing the software. When the second authentication information is consistent with the first authentication information, the software management command is executed.

It may be seen from the execution process of the method for software management described in the above technical solutions that the communication device executes the software management command only when the communication device receives the software management command and verifies that the second authentication information is consistent with the first authentication information, so that the service provider may manage the software that is installed on the communication device by the service provider via a software management command. In comparison with the prior art that software installed on the communication device by the service provider is jointly managed by the user and the service provider, in the embodiments of the present invention, it may be realized that software installed on the communication device by the service provider can only be managed by the service provider, and a user cannot manage the software installed on the communication device by the service provider.

BRIEF DESCRIPTION OF THE DRAWINGS

In order to more clearly illustrate the technical solutions of the embodiments of the present invention or the technical solutions of the prior art, the drawings needed in the description of the embodiments or the prior art will be briefly introduced below. Apparently, the drawings in the description below are only some embodiments of the present invention, and other drawings may also be obtained by those skilled in the art according to these drawings without creative work.

DETAILED DESCRIPTION

The technical solutions of the embodiments of the present invention will be described clearly and fully in connection with the drawings in the embodiments of the present invention. Apparently, the embodiments described are only a part of the embodiments of the present invention, rather than being the whole embodiments. All the other embodiments obtained by those skilled in the art based on the embodiments of the present invention without creative work belong to the protection scope of the present invention.

Figure 1:
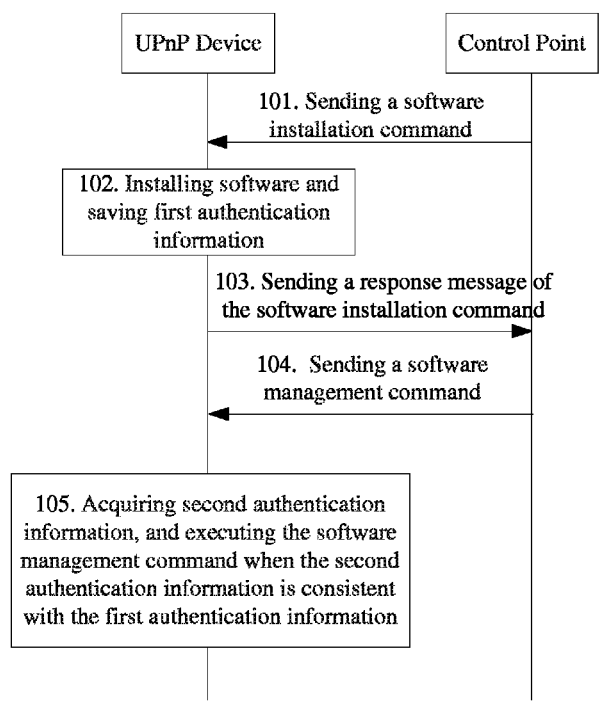
FIG. 1 is a flowchart of a method for software management according to an embodiment of the present invention.

In the method for software management according to an embodiment of the present invention as shown in FIG. 1, it is assumed that in the application scene, a service provider manages the software installed on a UPnP device via a control point disposed on a gateway. The method includes the following steps:

101: A first control device sends a software installation command to a device, and instructs the device to install software and save first authentication information of the software.

The first control device may be a control point disposed on a gateway, the control point has the function of a UPnP DM CP and has the right to install the software and manage software on a UPnP device, and the service provider can manage the UPnP device via the control point.

That is, the first control device may be a control point on the gateway, the control point has the right to install the software and manage the software on the UPnP device.

102: The UPnP device installs software according to the received software installation command sent by the first control device, and saves first authentication information required in managing the software.

In a specific application, the UPnP device may obtain a software module according to a software module address carried in the software installation command, and install the software.

103: When the UPnP device installs the software, the UPnP device sends a response message of the software installation command to the control point.

Step 103 is an optional step.

104: The UPnP device receives a software management command for managing the software sent by a second control device.

The second control device and the first control device may be the same control device, and specifically, may be the same control point. When a service provider needs to manage the software installed on a UPnP device by the service provider, the service provider sends the software management command to the device via the control point and instructs the device to manage the software.

105: The UPnP device acquires second authentication information required in managing the software, and executes the software management command when the second authentication information is consistent with the first authentication information.

The UPnP device acquires the second authentication information required to manage the software, verifies whether the second authentication information is consistent with the first authentication information, and executes the software management command when the second authentication information is consistent with the first authentication information.

When the verification result is consistent, the software will be managed according to the software management command. Because the communication device executes the software management command only when the communication device receives a software management command and verifies that the second authentication information is consistent with the first authentication information, thereby it is realized that software installed on the communication device by the service provider can only be managed by the service provider, and the user cannot manage the software installed on the communication device by the service provider.

It should be noted that, in the application scene assumed in the embodiment as shown in FIG. 1, the first control device for sending the software installation command and the second control device for sending the software management command are the same control device. However, in a practical application process, the first control device and the second control device may be different control devices.

In the embodiments of the present invention, the first control device and the second control device may be the same control device or may be different control devices. Herein, it is only for the purpose of convenient description to name them as the first control device and the second control device, rather than indicating different control devices.

Figure 2:
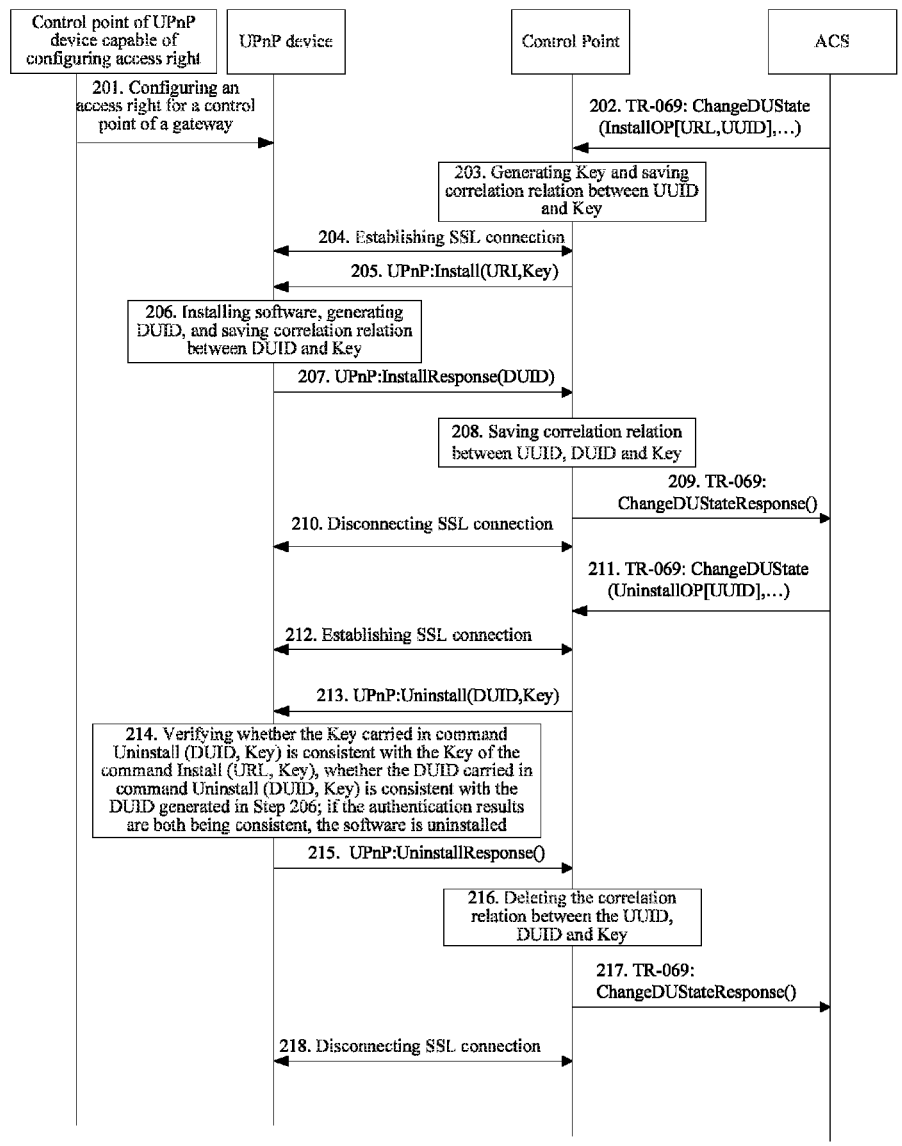
FIG. 2 is a flowchart of another method for software management according to an embodiment of the present invention.

In the method for software management according to another embodiment of the present invention as shown in FIG. 2, it is assumed that in the application scene, the service provider needs to uninstall the software which is installed on a UPnP device by the service provider. At this point, the software management command sent by the service provider via the control point disposed on the gateway is specifically a software uninstallation command. The method includes the following steps:

201: A control point of the UPnP device that is capable of configuring management right configures a management right of the software for a control point on the UPnP device, so that the control point may have the right to perform a management operation of the software on the UPnP device. For example, if it is required that only a user with Basic role can install the service software, a Basic right is configured for the control point.

It should be noted that, the management right of the control point with respect to the software on the UPnP device is configured by the control point of the UPnP device that is capable of configuring management right. In a specific implementation process, the control point of the UPnP device that is capable of configuring management right may acquire the identification of the control point, wherein the identification of the control point is represented by HGCPID. A Security Socket Layer (SSL) connection is established between the control point of the UPnP device that is capable of configuring management right and the UPnP device, so as to ensure the security of communication. Then, the management right on the UPnP device is configured for the control point corresponding to the HGCPID via a command AddRolesForIdentity (HGCPID) in the UPnP protocol. When the right configuration of the UPnP device is successfully performed, the UPnP device sends an AddRolesForIdentityResponse to the control point of the UPnP device that is capable of configuring management right via the UPnP protocol, and informs the control point of the UPnP device that is capable of configuring management right that the operation for configuring management right for the control point is successfully performed (however, other operation results may also be notified), and disconnects the SSL connection.

202: When the service provider needs to install the software on the UPnP device, an automatic configuration server (ACS) sends a software installation command to the control point via a TR-069 command, wherein the installation address uniform resource locator (URL) of the software and a second identification of the software are carried in the software installation command sent via TR-069 protocol, and the second identification may be represented by Universally Unique Identifier (UUID). In a specific application process, the software installation command sent via TR-069 protocol may be represented as ChangeDUState(InstallOP[URL, UUID], . . . ), wherein TR-069 command refers to a command that conforms to TR-069 protocol of BroadBand Forum (BBF).

It should be noted that, the ACS is an apparatus that may manage the gateway via TR-069 protocol.

It should be further noted that, in this embodiment, it is taken as an example that the interaction between the ACS and the gateway conforms to the TR-069 protocol. Certainly, the ACS may support other management protocols to manage the gateway, and the ACS may also employ other management protocols to interact with the gateway.

203: When the control point receives the software installation command sent by the ACS through TR-069 protocol, the control point generates first authentication information required to manage the software.

In an embodiment of the present invention, the first authentication information may specifically be a cryptographic key (Key) corresponding to the software, a correspondence relation between the Key and the UUID is saved, and the software installation command ChangeDUState(InstallOP[URL, UUID], . . . ) sent via TR-069 protocol is converted to a software installation command Install(URL, Key) transferred through UPnP protocol.

Certainly, the first authentication information may also be generated in other modes, so long as the sender of the software installation command (for example, the ACS or the CP) and the receiver and executor of the software installation command (for example, the UPnP device) both can obtain the same first authentication information. For example, after step 206, an embodiment of the present invention provides another mode for generating the first authentication information.

The first authentication information (for example, the Key) corresponding to the software is used for authenticating the control point. It may be seen from the conversion process of this step that, the first authentication information (for example, Key) and the installation address URL of the software are carried in the converted software installation command, and the software to be installed can be acquired from the installation address URL.

204: An SSL connection is established between the control point and the UPnP device to ensure the security of communication.

This step is an additional measure for ensuring communication security, and this step may be omitted in the case that the communication security is not considered or the requirement on communication security is not strict.

205: The control point sends the converted software installation command Install(URL, Key) to the UPnP device through UPnP protocol, and instructs the device to install the software and save the first authentication information required to manage the software, wherein the first authentication information is an identification code, and may specifically be a Key corresponding to the software.

In a practical application, because an existing Install command does not contain a parameter of the first authentication information (for example, Key), the Install command needs to be extended, and a parameter Key is added to represent the first authentication information, as shown in the following table:

| Argument | Direction |
| --- | --- |
| DUURI | IN |
| DUType | IN |
| HandleDependencies | IN |
| Key | IN |
| OperationID | OUT |

206: The UPnP device installs the software according to the received software installation command Install(URL, Key) sent by the control point. When the software is installed, a first identification of the software is generated. The first identification may be represented by Dynamic Host Configuration Protocol Unique Identifier (DUID), and a correlation relation between the first authentication information (for example, Key) and the first identification of the software (for example, DUID) is saved.

In a specific application process, before the software is installed, the UPnP device may verify whether the control point has the right to execute the Install command. If the control point has the right, the UPnP device installs the software, generates the software identification (first identification) and saves the correlation relation between the first authentication information (for example, Key) and the first identification (for example, DUID).

It should be noted that, the first authentication information (for example, Key) may not be generated in step 203 by the control point. Instead, the first authentication information may be generated in this step by the device during installation of the software and returned to the control point via a response message of the above software installation command.

207: The UPnP device sends a response message of the software installation command to the control point through UPnP protocol, wherein the response message carries the first identification of the software (for example, DUID). The message may be represented as InstallResponse (DUID) in UPnP protocol.

If the first authentication information (for example, Key) is generated by the device during installation of the software, the response message of the software installation command should further carry the first authentication information (for example, Key).

208: The control point saves a correlation relation among the first authentication information (for example, Key), the first identification (for example, DUID) and the second identification (for example, UUID).

209: The control point returns a response message ChangeDUStateResponse ( ) to the ACS via TR-069 protocol and informs the ACS that the software has been installed successfully.

210: When the control point does not need to send a UPnP command to the UPnP device, the SSL connection established between the control point and the UPnP device is disconnected.

As described above, if Step 204 is not performed, the present step is omitted correspondingly.

211: When the software that has been installed on the UPnP device is needed to be uninstalled, the ACS sends a software uninstallation command to the control point via TR-069 protocol and instructs the control point to uninstall the software on the UPnP device.

The software uninstallation command sent via TR-069 protocol carries the second identification of the software (for example, UUID). In TR-069 protocol, the software uninstallation command may be represented as ChangeDUState(UninstallOP[UUID], . . . ), wherein, the second identification (for example, UUID) of the software is used for indicating which software is to be uninstalled.

212: An SSL connection is established between the control point and the UPnP device to ensure the security of communication.

This step may also be omitted as Step 204.

213: The control point converts the software uninstallation command ChangeDUState(UninstallOP[UUID], . . . ) sent via TR-069 protocol to a software uninstallation command Uninstall(DUID, Key) transferred through UPnP protocol.

During the specific application, because the second identification (for example, UUID) is carried in the command ChangeDUState(UninstallOP[UUID], . . . ) received by the control point from the ACS, the first identification of the software (for example, DUID) may be looked up in the correlation relation saved in Step 208 according to the second identification of the software (for example, UUID), and then the first identification (for example, DUID) and the first authentication information (for example, Key) are added to the converted command Uninstall.

The converted software uninstallation command Uninstall (DUID, Key) is sent to the UPnP device through UPnP protocol, the software management command carries the second authentication information required to manage the software, wherein the second authentication information may be an identification code, and may specifically be a Key corresponding to the software. At this point, the software uninstallation command carries the second authentication information (for example, Key), and the software uninstallation command may also carry the first identification of the software (for example, DUID).

It should be noted that, in the existing UPnP protocol, the command Uninstall( ) does not carry the second authentication information (for example, parameter Key), so the command Uninstall( ) needs to be extended, and the parameter Key (which represents the parameter of the second authentication information) is added, as shown in the following table:

| Argument | Direction |
| --- | --- |
| DUID | IN |
| HandleDependencies | IN |
| Key | IN |
| OperationID | OUT |

214: The UPnP device receives the software uninstallation command Uninstall(DUID, Key) and acquires the second authentication information, for example, the Key, from the uninstallation command. Meanwhile, the UPnP device verifies whether the second authentication information (for example, Key) carried in the command Uninstall(DUID, Key) is consistent with the first authentication information (for example, Key) carried in the command Install(URL, Key) sent in Step 205.

In an embodiment of the present invention, when the first identification DUID of the software is further carried in the software uninstallation command, it may also be verified whether the first identification DUID of the software carried in the command Uninstall(DUID, Key) is consistent with the first identification DUID generated after the software installation command is executed in Step 206.

When the verification results are both being consistent, the software is uninstalled; otherwise, the operation of uninstalling the software will not be performed.

In a specific embodiment of the present invention, before performing the above verification processes, the UPnP device may first verify whether the control point has the right to execute the command Uninstall(DUID, Key). If the control point has the right, it is verified whether the second authentication information (for example, Key) carried in the command Uninstall(DUID, Key) is consistent with the first authentication information (for example, Key) carried in the command Install(URL, Key) sent in Step 205, and whether the first identification of the software (for example, DUID) carried in the command Uninstall(DUID, Key) is consistent with the first identification (for example, DUID) generated after the software installation command is executed in Step 206. If they are consistent, the command for uninstalling the software is executed; otherwise, the command is not executed.

215: The UPnP device returns a software uninstallation success response message UninstallResponse ( ) to the control point through UPnP protocol, which indicates that the software is uninstalled successfully.

The object of this step is to inform the control point of the uninstall result. For some embodiments of the present invention, in the case that the control point is not informed of the uninstall result or the control point does not care for the uninstall result, this step may be omitted.

216: The control point receives the software uninstallation success response message, and deletes the correlation relation among the first authentication information (Key), the first identification and the second identification. For example, the correlation relation among the UUID, DUID and Key saved in Step 208 is deleted.

In some embodiments of the present invention, if Step 215 is not executed, Step 216 may be omitted.

In an embodiment of the present invention, in the case that Step 215 is executed, the execution of Step 216 may save the storage space on the control point by deleting the redundant information. However, it can be understood by those skilled in the art that, in the case that the storage resource occupied by such information is very small relative to the storage space on the control point, or the control point does not care for the problem of storage space, this step may be omitted. Moreover, it can also be understood by those skilled in the art that the above described embodiment of the present invention has been illustrated by taking the case in which the software management command is software uninstall command as an example, and in some embodiments of the present invention, when the software management command is not the software uninstallation command, this step may also be omitted.

217: The control point returns an uninstallation success response ChangeDUStateResponse ( ) to the ACS via TR-069 protocol.

Similar to the illustration of Step 215, for some embodiments of the present invention, this step may be omitted.

218: The control point disconnects the SSL connection between the control point and the UPnP device.

Similar to the illustration of Step 204, for some embodiments of the present invention, this step may be omitted.

By employing the method for software management provided by the embodiment of the present invention, when a service provider wants to manage a UPnP device, the service provider may dispose a control point on a gateway of a user in advance, and realize the management of a terminal that supports UPnP DM via the control point. When the user wants to use an advanced service on the terminal, the user may first subscribe for the advanced service from the service provider and obtain a terminal that supports the service, wherein the terminal may be provided by the service provider or purchased by the user in a retail channel, and the terminal also supports UPnP DM function. Then, the service provider installs software for the advanced service on the terminal via the control point remotely and realizes the management of the software installed by the service provider. Because the communication device executes the software management command only when the communication device receives the software management command sent by the service provider and verifies that the second authentication information is consistent with the first authentication information, thus in comparison with the prior art that software installed on the UPnP device by the service provider may be managed by an administrator user and the service provider, in the embodiment of the present invention, it is realized that only the service provider can manage the software installed on the UPnP device by the service provider, and the user cannot manage the software installed by the service provider on the communication device.

It should be noted that, the above application scene has been introduced by taking the case in which the service provider uninstalls the software installed on the UPnP device by the service provider as an example. In a practical application process, the service provider may also send a software update command, or a software start command, or a software stop command via the control point, thereby the management on the software such as software update, start and stop, etc., may be realized by employing the method for software management according to the embodiments of the present invention. The specific implementing process is similar, so it will not be described again here.

In the above Step 214, the control point is authenticated via a cryptographic key corresponding to the software. In an embodiment of the present invention, the control point may also be authenticated with the identification of the control point, that is, the first authentication information and the second authentication information are both identifications of the control point. The method for software management according to another embodiment of the present invention will be introduced below still by taking software uninstallation as an example, which specifically includes the following steps:

31: A control device sends a software installation command to a communication device, and instructs the communication device to install the software.

32: The communication device installs the software according to the received software installation command sent by the control device, and saves the identification of the control device, the identification of the control device is acquired via a communication connection with the control device.

33: The control device sends a software management command to the communication device, and instructs the communication device to manage the software.

34: The communication device receives the software management command sent by the control device, and acquires the identification of the control device via the communication connection with the control device.

35: When an authentication is needed in a management of the software, the communication device verifies whether the identification of the control device that sends the software installation command is consistent with the identification of the control device that sends the software management command. When the identification of the control device that sends the software installation command is consistent with the identification of the control device that sends the software management command, the software management command is executed.

Figure 3:
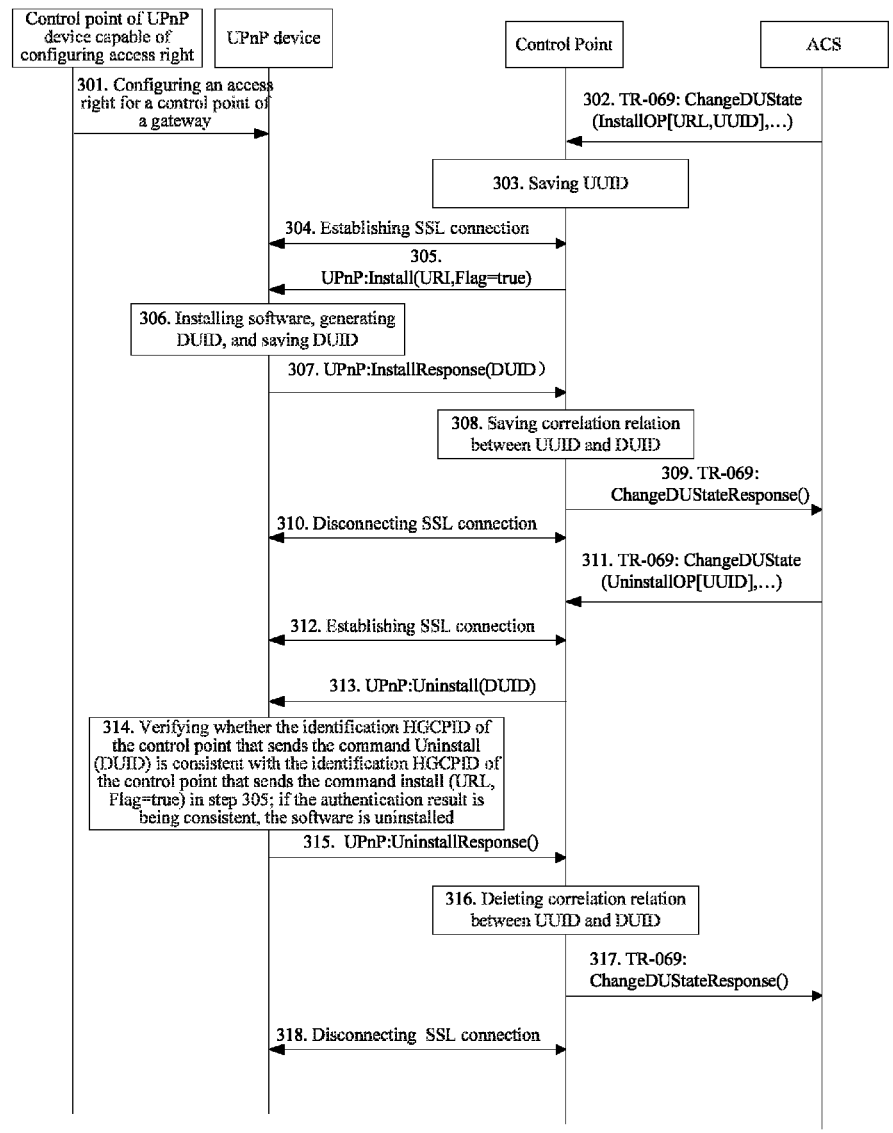
FIG. 3 is a flowchart of yet another method for software management according to an embodiment of the present invention.

Further, the implementing process of the method for software management when the control point is authenticated with the identification of the control point will be illustrated more clearly and fully in connection with the method for software management shown in FIG. 3. As shown in FIG. 3, the method includes the following steps:

Step 301: A control point of the UPnP device that is capable of configuring management right configures a management right of the software to a control point on the UPnP device, so that the control point may have the right to perform a management operation of the software on the UPnP device. For example, if it is required that only a user with Basic role can install the service software, a Basic right is configured for the control point.

It should be noted that, the management right of the software of the control point on the UPnP device is configured by the control point of the UPnP device that is capable of configuring management right. In a specific implementation process, the control point of the UPnP device that is capable of configuring management right may acquire the identification of the control point that is represented by HGCPID. An SSL connection is established between the control point of the UPnP device that is capable of configuring management right and the UPnP device, so as to ensure the security of communication. Then, a management right on the UPnP device is configured for the control point via a command AddRolesForIdentity (HGCPID) in UPnP protocol. When the right is successfully configured for the UPnP device, the UPnP device sends AddRolesForIdentityResponse to the control point of the UPnP device that is capable of configuring management right through UPnP protocol, informs the control point of the UPnP device that is capable of configuring management right that a management right has been successfully configured for the control point, and disconnects the SSL connection.

302: An ACS sends a software installation command ChangeDUState(InstallOP[URL, UUID], . . . ) to the control point via a TR-069 command, wherein the installation address URL of the software and a second identification of the software are carried in the software installation command sent via TR-069 protocol, and the second identification is represented by UUID.

It should be noted that, the ACS is an apparatus that may manage the gateway via TR-069 protocol.

303: The control point converts the software installation command ChangeDUState(InstallOP[URL, UUID], . . . ) sent via TR-069 protocol to a software installation command transferred through UPnP protocol, and saves UUID.

304: An SSL connection is established between the control point and the UPnP device to ensure the security of the communication.

305: The control point sends the converted software installation command to the UPnP device through UPnP protocol. In a specific implementation, the converted software installation command is represented by a command Install( ) that carries URL.

In the specific application process, the converted software installation command Install() may also carry a specific authentication parameter Flag=true, for indicating whether the authentication is needed during software management. At this point, the software installation command may be specifically represented by Install (URL, Flag=true).

306: The UPnP device installs the software according to the received software installation command Install(URL, Flag=true) sent by the control point. When the software is installed, a first identification of the software is generated, the first identification is represented by DUID.

In the specific application process, before installing the software, the UPnP device may verify whether the control point has the right to execute the Install command. If the control point has the right, the UPnP device installs the software and generates the software identification DUID. If Flag=true, the UPnP device saves the HGCPID corresponding to the software installed, wherein the HGCPID is the first authentication information required to manage the software. It should be noted that, the HGCPID may be obtained when the SSL connection is established. For example, the HGCPID may be obtained in Step 304.

307: The UPnP device sends a message that the software is successfully installed to the control point through UPnP protocol, wherein the message carries the first identification DUID of the software. The message is represented as InstallResponse (DUID) in UPnP protocol.

308: The control point saves a correlation relation between the first identification DUID and the second identification UUID.

309: The control point returns a response message ChangeDUStateResponse( ) to the ACS via TR-069 protocol, and informs the ACS that the software has been installed successfully.

310: When the control point does not need to send a UPnP command to the UPnP device, the SSL connection established between the control point and the UPnP device is disconnected.

311: When it is required to uninstall the software that has been installed on the UPnP device, the ACS sends a software uninstallation command ChangeDUState(UninstallOP [UUID], . . . ) to the control point via TR-069 protocol, and instructs the control point to uninstall the software on the UPnP device.

312: An SSL connection is established between the control point and the UPnP device to ensure the security of the communication.

313: The control point converts the software uninstallation command ChangeDUState(UninstallOP[UUID], . . . ) sent via TR-069 protocol to a software uninstallation command Uninstall(DUID) transferred through UPnP protocol.

In the specific application, because the command ChangeDUState(UninstallOP[UUID], . . . ) received by the control point from the ACS carries the UUID identification, and the UPnP device saves the first identification DUID of the software. At this point, the first identification DUID of the software may be looked up in the correlation relation saved in step 308 according to the second identification UUID of the software, and then the DUID is added to the converted Uninstall command.

The converted software uninstallation command Uninstall (DUID) is sent to the UPnP device through UPnP protocol. At this point, the software uninstallation command carries the first identification DUID of the software.

314: When an authentication is needed in a management of the software, the second authentication information required to manage the software is acquired, that is, the identification HGCPID of the control point that sends the command Uninstall(DUID) is acquired. Meanwhile, the UPnP device verifies whether the identification HGCPID of the control point that sends the command Uninstall(DUID) is consistent with the identification HGCPID of the control point that sends the command install(URL, Flag=true) in step 305.

It should be noted that, the identification HGCPID of the control point that sends the command Uninstall(DUID) is the second authentication information required to manage the software, wherein the second authentication information may be specifically acquired when the SSL connection is established between the control point and the UPnP device in Step 312.

In the specific application, the control point functions as a control device, and the identification of the control point may specifically include one or more of the following: a globally unique identification of the control point, a hashed value calculated according to the certificate of the control point and the account information of a user that logs on the control point.

When the verification result is consistent, the software is uninstalled; otherwise, the operation of uninstalling the software is not performed.

In the specific application process, before performing the above authentication processes, the UPnP device first verifies whether the control point has the right to execute the command Uninstall(DUID). If the control point has the right, the UPnP device checks whether authentication is needed in managing the software. When authentication is needed in managing the software, the UPnP device verifies whether the identification HGCPID of the control point that sends the command Uninstall(DUID) is consistent with the identification HGCPID of the control point that sends the software installation command. If they are consistent, the command for uninstalling the software is executed; otherwise, the command is not executed.

315: The UPnP device returns a software uninstallation success response message UninstallResponse() to the control point through UPnP protocol, which indicates that the software is uninstalled successfully.

316: The control point receives the software uninstallation success response message, and deletes the correlation relation between the first identification and the second identification, that is, the correlation relation between DUID and UUID saved in Step 308.

317: The control point returns an uninstallation success response ChangeDUStateResponse() to the ACS via TR-069 protocol.

Step 318: The control point disconnects the SSL connection between the control point and the UPnP device.

It may be seen from the execution process of the method for software management described in the above technical solutions that, because the UPnP device executes the software management command only when the UPnP device receives the software management command sent by the service provider and verifies that the second authentication information is consistent with the first authentication information, thus in comparison with the prior art that the software installed on the UPnP device by the service provider is jointly managed by the user and the service provider, in the embodiment of the present invention, it may be realized that the software installed on the UPnP device by the service provider can only be managed by the service provider, and the user cannot manage the software installed on the communication device by the service provider.

The application scene assumed in the above embodiment is introduced by taking the case in which software installed on the UPnP device is managed via the control point as an example. In the embodiment of the present invention, the software installed on an Intelligent Grouping and Resource Sharing (IGRS) device may also be managed via a control device, wherein the control device is a control device for managing the IGRS device. The specific implementing process is similar to the above process for managing the software installed on the UPnP device, and the differences are that in the above embodiment, the software installation command/software management command is sent through UPnP protocol, but when applied to the IGRS device, the software installation command /software management command is sent through IGRS protocol.

Figure 4:
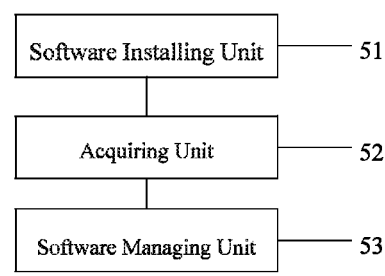
FIG. 4 is a structure view of a communication device according to an embodiment of the present invention.

A communication device is provided in the embodiment shown in FIG. 4, the communication device includes: a software installing unit 51, an acquiring unit 52 and a software managing unit 53.

The software installing unit 51 is adapted to receive a software installation command sent by a first control device, install the software according to the software installation command and save first authentication information required in managing the software.

The acquiring unit 52 is adapted to receive a software management command sent by a second control device, and acquire second authentication information corresponding to the software management command, wherein the software management command is used for managing the software. The software management command includes software update command, or software start command, or software stop command, or software uninstallation command.

The software managing unit 53 is used to execute the software management command when the second authentication information is consistent with the first authentication information.

It should be noted that, the software installing unit 51 is specifically adapted to receive the software management command sent by the second control device, install the software according to the software installation command, and acquire and save the first authentication information from the software installation command.

Alternatively, in another possible case, the software installing unit 51 is specifically adapted to receive the software management command sent by the second control device, install the software according to the software installation command, generate and save the first authentication information, and send the first authentication information to the first control device.

The acquiring unit 52 is specifically adapted to receive the software management command sent by the second control device, and acquire the second authentication information from the software management command.

More specifically, when the first authentication information is the identification of the first control device, the software installing unit 51 is specifically adapted to install the software according to the software installation command received from the first control device and save the identification of the first control device. The acquiring unit 52 is specifically adapted to acquire the identification of the second control device. The software managing unit 53 is specifically adapted to execute the software management command when the identification of the first control device is consistent with the identification of the second control device.

The identification of the above control device may include one or more of the following: a globally unique identification of the control device, a hashed value calculated according to the certificate of the control device, and account information of a user that logs on the control device.

It should be noted that, when the communication device is the UPnP device, if the first control device is the first control point, the software installing unit receives the software installation command sent by the first control point through UPnP protocol. If the second control device is the second control point, the acquiring unit receives the software management command sent by the second control point through UPnP protocol. The first control point and the second control point are both control points that manage the UPnP device.

When the communication device is the IGRS device, the software installing unit receives the software installation command sent by the first control device through IGRS protocol, the acquiring unit receives the software management command sent by the second control device through IGRS protocol, and the first control device and the second control device are both control devices that manage the IGRS device.

The communication device according to the embodiment of the present invention executes the software management command only when the communication device receives the software management command and verifies that the second authentication information is consistent with the first authentication information. In comparison with the prior art that software installed on a communication device by a service provider is jointly managed by the user and the service provider, in the embodiment of the present invention, it may be realized that software installed on the UPnP device by the service provider can only be managed by the service provider, and the user cannot manage the software installed on the communication device by the service provider.

Figure 5:
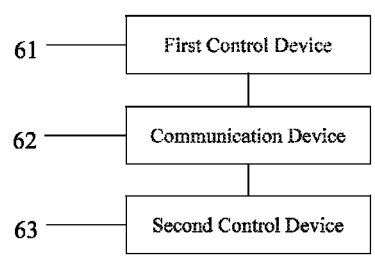
FIG. 5 is a structure view of a system for software management according to an embodiment of the present invention.

A system for software management is provided in the embodiment shown in FIG. 5, the system includes: a first control device 61, a communication device 62 and a second control device 63.

Wherein, the first control device 61 is adapted to send a software installation command to a communication device, and instruct the communication device to install the software and save first authentication information required in managing the software.

The communication device 62 is adapted to receive the software installation command sent by the first control device, install the software according to the software installation command and save the first authentication information required in managing the software.

The second control device 63 is adapted to send a software management command to the communication device, and instruct the communication device to manage the software.

The communication device 62 is further adapted to receive the software management command sent by the second control device, acquire second authentication information corresponding to the software management command, wherein the software management command is used to manage the software, and the software management command is executed when the second authentication information is consistent with the first authentication information.

It should be noted that, the first control device and the second control device described above may be the same control device, or may be different control devices.

In the practical application process, the system for software management may also include a control point of the communication device that is capable of configuring management right, the control point is adapted to configure a management right on a software module for a control device on the communication device. In addition, when the control device is implemented via a gateway, the system for software management may also include: an automatic configuration server ACS, which is adapted to manage the gateway.

The embodiments of the present invention are mainly applied to the field of communication technologies, and it may be realized that software installed on the communication device by the service provider can only be managed by the service provider, and the user cannot manage the software installed on the communication device by the service provider.

With the description of the above embodiments, those skilled in the art may clearly understand that the present invention may be implemented with the aid of software plus necessary universal hardware. Certainly, the present invention may be implemented by hardware. However, in many cases, the former is preferred. Based on such an understanding, the essential part of the present invention, or in other words, the part that contributes to the prior art, may be embodied in the form of a software product that is stored in a readable storage medium, such as floppy disk, hard disk, compact disc, etc., of a computer, and includes several instructions that can make a computer apparatus (which may be a personal computer, a server, a network apparatus, etc.) implement the methods according to various embodiments of the present invention.

The above are only specific embodiments of the invention. However, the scope of protection of the present invention is not limited thereto. Variations and modifications will readily occur to those skilled in the art in the technical scope disclosed by the present invention without departing from the spirit or scope of the invention. Thus, the scope of protection of the present invention is defined by the scope of protection of the appended claims.

What is claimed is:

1. A method for software management of a communication device comprising:
    receiving by a communication connection of the communication device a software installation command sent by a first control device;
    installing software according to the software installation command on a non-transitory computer readable storage medium of the communication device;
    generating with the communication device first identification information of the software after the software is installed;
    saving first authentication information required in managing the software to the non-transitory computer readable storage medium of the communication device, wherein the first authentication information comprises an identification of the first control device;
    receiving by the communication connection of the communication device a software management command for managing the software sent by a second control device, wherein the software management command comprises second authentication information and second identification information of the software, wherein the second authentication information comprises an identification of the second control device, wherein the software management command comprises a software uninstall command, wherein the software uninstall command is received by the second control device in a TR-069 protocol from an Automatic Configuration Server (ACS), wherein the second control device converts the uninstall command in the TR-069 protocol to a Universal Plug and Play (UPnP) protocol and adds the second authentication information and the second identification information to the uninstall command;
    acquiring the second authentication information corresponding to the software management command; and
    executing with the communication device the software management command when the second authentication information is consistent with the first authentication information and when the second identification information of the software is consistent with the first identification information of the software.

2. The method for software management of the communication device according to claim 1, wherein before the first authentication information required in managing the software is saved, the method further comprises acquiring the first authentication information from the software installation command.

3. The method for software management of the communication device according to claim 1, wherein before the first authentication information required in managing the software is saved, the method further comprises generating the first authentication information, and wherein the method further comprises sending the first authentication information to the first control device.

4. The method for software management of the communication device according to claim 1, wherein acquiring the second authentication information corresponding to the software management command comprises acquiring the second authentication information from the software management command.

5. The method for software management of the communication device according to claim 1, wherein installing the software according to the software installation command comprises installing the software according to the software installation command received from the first control device, wherein saving the first authentication information required in managing the software comprises saving the identification of the first control device, wherein acquiring the second authentication information corresponding to the software management command comprises acquiring an identification of the second control device, and wherein executing the software management command when the second authentication information is consistent with the first authentication information comprises executing the software management command when the identification of the first control device is consistent with the identification of the second control device.

6. The method for software management of the communication device according to claim 5, wherein the identification of the control device comprises one or more of a globally unique identification of the control device, a hashed value calculated according to a certificate of the control device, and account information of a user that logs on the control device.

7. The method for software management of the communication device according to claim 1, wherein the first control device comprises a first control point, wherein receiving the software installation command sent by the first control device comprises receiving the software installation command sent by the first control point through Universal Plug and Play (UPnP) protocol, wherein the second control device comprises a second control point, and wherein receiving the software management command sent by the second control device comprises receiving the software management command sent by the second control point through the UPnP protocol.

8. The method for software management of the communication device according to claim 1, wherein receiving the software installation command sent by the first control device comprises receiving the software installation command sent by the first control device through Intelligent Grouping and Resource Sharing (IGRS) protocol, and wherein receiving the software management command sent by the second control device comprises receiving the software management command sent by the second control device through the IGRS protocol.

9. The method for software management of the communication device according to claim 1, wherein the first control device and the second control device comprise multiple control devices.

10. The method for software management of the communication device according to claim 1, wherein the first control device and the second control device comprise one control device.

11. A communication device comprising:
a communication connection between the communication device and a first control device that is configured to receive a software installation command sent by the first control device; and
a non-transitory computer readable storage medium configured to install software according to the software installation command,
wherein the communication device is configured to generate first identification information of the software after the software is installed, and save first authentication information required in managing the software,
wherein the first authentication information comprises an identification of the first control device;
wherein the communication connection is further configured to receive a software management command for managing the software sent by a second control device, wherein the software management command comprises second authentication information and second identification information of the software, wherein the second authentication information comprises an identification of the second control device, wherein the software management command comprises a software uninstall command, wherein the software uninstall command is received by the second control device in a TR-069 protocol from an Automatic Configuration Server (ACS), wherein the second control device converts the uninstall command in the TR-069 protocol to a Universal Plug and Play (UPnP) protocol and adds the second authentication information and the second identification information to the uninstall command; and
wherein the communication device is further configured to acquire the second authentication information corresponding to the software management command and execute the software management command when the second authentication information is consistent with the first authentication information and when the second identification information of the software is consistent with the first identification information of the software.

12. The communication device according to claim 11, wherein the communication device is further configured to acquire the first authentication information from the software installation command and save the first authentication information.

13. The communication device according to claim 11, wherein the communication device is further configured to generate and save the first authentication information, and wherein the communication device is further configured to send the first authentication information to the first control device.

14. The communication device according to claim 11, wherein the communication device is further configured to acquire the second authentication information from the software management command.

15. The communication device according to claim 11, wherein the communication device is configured to:
install the software according to the software installation command received from the first control device and save the identification of the first control device;
acquire an identification of the second control device; and
execute the software management command when the identification of the first control device is consistent with the identification of the second control device.

16. The method for software management of the communication device according to claim 1, wherein the first control device receives the software installation command sent by the ACS through the TR-069 protocol command and converts the software installation command to a software command that is transferred through the UPnP protocol.

17. The method for software management of the communication device according to claim 1, wherein the software is installed by a UPnP device, wherein before the UPnP device installs the software, the UPnP device verifies whether the first control point has a right to execute an install command, and wherein the software installation command comprises a Uniform Resource Locator (URL).

18. The communication device according to claim 11, wherein the first control device receives the software installation command sent by the ACS through the TR-069 protocol command and converts the software installation command to a software command that is transferred through the UPnP protocol.

19. The communication device according to claim 11, wherein the software is installed by a UPnP device, wherein before the UPnP device installs the software, the UPnP device verifies whether the first control point has a right to execute an install command, and wherein the software installation command comprises a Uniform Resource Locator (URL).

20. The method for software management of the communication device according to claim 1, further comprising establishing Secure Sockets Layer (SSL) connections with the first control device and the second control device, wherein the software installation command is received over the SSL connection with the first control device, wherein the software management command is received over the SSL connection with the second control device, wherein the first control device and the second control device comprise gateways that are communicatively coupled to a UPnP device, wherein the first control device and the second control device are communicatively coupled to the ACS, wherein the first control device and the second control device communicate with the ACS through the TR-069 protocol, wherein the first control device and the second control device communicate with the UPnP device through the UPnP protocol, and wherein the UPnP device sends a software uninstallation success response message to the second control device through the UPnP protocol.

21. The communication device according to claim 11, wherein Secure Sockets Layer (SSL) connections are established between the communication device and the first control device and the second control device, wherein the software installation command is received over the SSL connection with the first control device, wherein the software management command is received over the SSL connection with the second control device, wherein the first control device and the second control device comprise gateways that are communicatively coupled to a UPnP device, wherein the first control device and the second control device are communicatively coupled to the ACS, wherein the first control device and the second control device communicate with the ACS through the TR-069 protocol, wherein the first control device and the second control device communicate with the UPnP device through the UPnP protocol, and wherein the UPnP device sends a software uninstallation success response message to the second control device through the UPnP protocol.

* * * * *